(12) United States Patent
Riepenhausen et al.

(10) Patent No.: US 11,092,431 B2
(45) Date of Patent: Aug. 17, 2021

(54) METHOD AND DEVICE FOR CHARACTERIZING THE SURFACE SHAPE OF AN OPTICAL ELEMENT

(71) Applicant: Carl Zeiss SMT GmbH, Oberkochen (DE)

(72) Inventors: Frank Riepenhausen, Oberkochen (DE); Martin Schroeter, Oberkochen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 0 days.

(21) Appl. No.: 16/834,038

(22) Filed: Mar. 30, 2020

(65) Prior Publication Data

US 2020/0225029 A1 Jul. 16, 2020

Related U.S. Application Data

(63) Continuation of application No. PCT/EP2018/073703, filed on Sep. 4, 2018.

(30) Foreign Application Priority Data

Sep. 29, 2017 (DE) ...................... 10 2017 217 371.8

(51) Int. Cl.
*G01B 11/24* (2006.01)
*G01B 9/02* (2006.01)
(Continued)

(52) U.S. Cl.
CPC ...... *G01B 11/2441* (2013.01); *G01B 9/02039* (2013.01); *G01B 9/02085* (2013.01); *G01M 11/005* (2013.01); *G01M 11/0271* (2013.01)

(58) Field of Classification Search
CPC ............ G01B 9/02039; G01B 9/02083; G01B 9/02085; G01B 11/2441; G01M 11/005; G01M 11/0271
See application file for complete search history.

(56) References Cited

U.S. PATENT DOCUMENTS 6,956,657 B2   10/2005  Golini et al.
7,221,461 B2*  5/2007   Evans ................ G01B 11/2441
                                                        356/511

(Continued)

FOREIGN PATENT DOCUMENTS

DE           60210195 T2    1/2007
DE         112009005390 B4   5/2017

OTHER PUBLICATIONS

International Search Report, PCT/EP2018/073703 dated Nov. 23, 2018, 5 pages.

(Continued)

*Primary Examiner* — Michael A Lyons
(74) *Attorney, Agent, or Firm* — Edell, Shapiro & Finnan, LLC (57) ABSTRACT

A method and apparatus for characterizing the surface form of an optical element, in particular a mirror or a lens element of a microlithographic projection exposure apparatus, includes: carrying out a plurality of interferometric measurements, in each of which an interferogram is recorded between a test wave emanating from a portion of the optical element in each case and a reference wave, the position of the optical element relative to the test wave being altered between these measurements, and calculating the figure of the optical element on the basis of these measurements. This calculation is carried out iteratively such that, in a plurality of iteration steps, the figure of the optical element is ascertained in each case by carrying out a forward calculation, each of these iteration steps being based in each case on a reference wave that was adapted based on the preceding iteration step.

9 Claims, 5 Drawing Sheets

(51) Int. Cl.
    *G01M 11/00*    (2006.01)
    *G01M 11/02*    (2006.01)

(56)          References Cited

U.S. PATENT DOCUMENTS

| | | |
|---|---|---|
| 9,128,004 B2 | 9/2015 | Oshima |
| 2003/0117632 A1 | 6/2003 | Golini et al. |
| 2009/0079992 A1* | 3/2009 | Doerband .......... G01B 9/02039 |
| | | 356/496 |
| 2009/0251702 A1 | 10/2009 | Murphy et al. |
| 2011/0119011 A1 | 5/2011 | Yamazoe |
| 2011/1109011 | 5/2011 | Yamazoe |
| 2014/0132960 A1* | 5/2014 | Chen .................. G01M 11/025 |
| | | 356/457 |
| 2016/0003611 A1* | 1/2016 | Furukawa ............ G01M 11/025 |
| | | 702/167 |
| 2016/0085061 A1 | 3/2016 | Schwab |

OTHER PUBLICATIONS

Fleig et al., "An automated subaperture stitching interferometer workstation for spherical and aspherical surfaces", Proceedings of SPIE, US, vol. 5188, Nov. 7, 2003, pp. 296-307.
GPTO Office Action with English translation, DE 1020172107371.8, dated May 29, 2018, 7 pages.
International Preliminary Report on Patentability, PCT/EP2018/073703, dated Mar. 31, 2020, 16 pages.

* cited by examiner

METHOD AND DEVICE FOR CHARACTERIZING THE SURFACE SHAPE OF AN OPTICAL ELEMENT

CROSS REFERENCE TO RELATED APPLICATIONS

This is a Continuation of International Application PCT/EP2018/073703, which has an international filing date of Sep. 4, 2018, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2017 217 371.8 filed on Sep. 29, 2017.

FIELD OF THE INVENTION

The invention relates to a method and an apparatus for characterizing the surface form of an optical element, in particular a mirror or a lens element of a microlithographic projection exposure apparatus.

BACKGROUND

Microlithography is used for production of microstructured components, for example integrated circuits or LCDs. The microlithography process is conducted in what is called a projection exposure apparatus, which comprises an illumination device and a projection lens. The image of a mask (=reticle) illuminated by the illumination device is in this case projected by the projection lens onto a substrate (e.g., a silicon wafer) coated with a light-sensitive layer (photoresist) and arranged in the image plane of the projection lens, in order to transfer the mask structure to the light-sensitive coating of the substrate.

In projection lenses designed for the extreme ultraviolet (EUV) range, i.e., at wavelengths of, e.g., approximately 13 nm or approximately 7 nm, mirrors are used as optical components for the imaging process owing to the lack of availability of suitable light-transmissive refractive materials. Typical projection lenses designed for EUV, as known e.g. from US 2016/0085061 A1, may have for example an image-side numerical aperture (NA) in the region of NA=0.55 and image an (e.g., ring-segment-shaped) object field into the image plane or wafer plane.

The increase of the image-side numerical aperture (NA) is typically accompanied by an enlargement of the required mirror areas of the mirrors used in the projection exposure apparatus. This in turn means that, in addition to manufacturing, testing the surface form of the mirrors is also a demanding challenge.

Figure 2A:
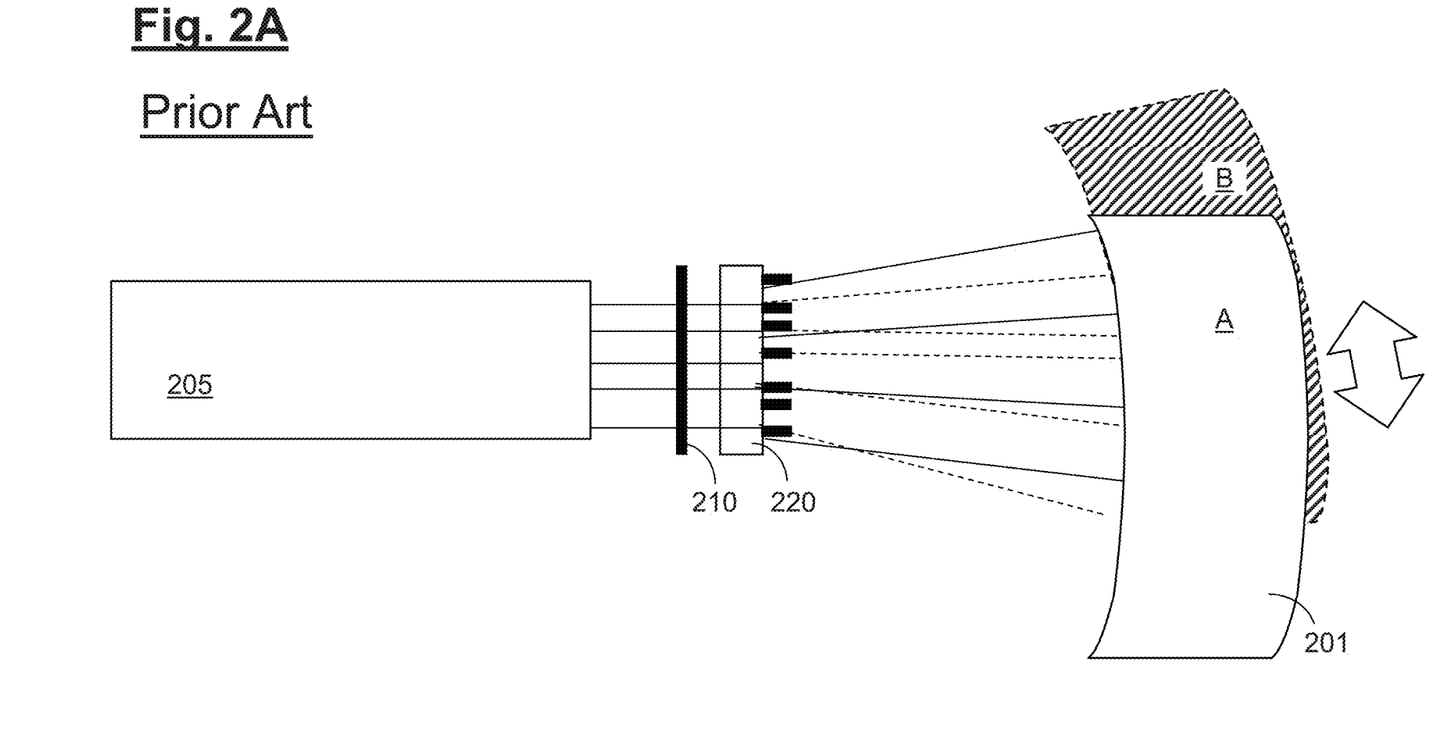
FIG. 2A illustrates an exemplary interferometric test arrangement that is known from the prior art, but that is able to be used within the scope of the invention.
Figure 3:
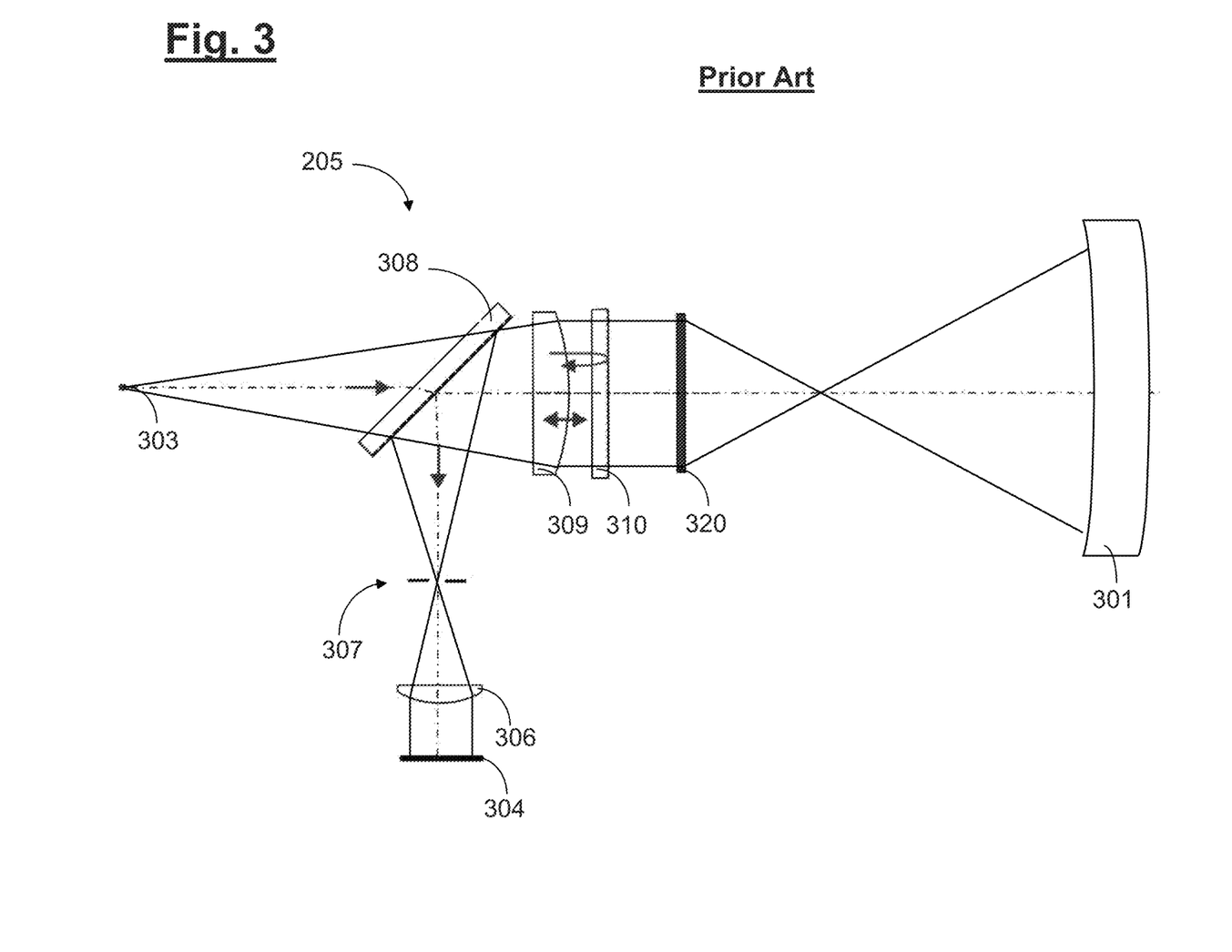
FIG. 3 shows an exemplary conventional interferometer that is able to be used with the interferometric test arrangement of FIG. 2A.

FIG. 2A shows a schematic illustration for explaining a functional principle of a possible conventional interferometric test arrangement for testing a mirror 201. According to FIG. 2A, an interferogram between reference light (referred to as "reference wave" below) that is reflected at a reference surface 210 ("Fizeau plate") and measurement light (also referred to as "test wave" below) that is reflected at the mirror 201 is produced in a Fizeau arrangement. Here, in the example of FIG. 2A, the measurement light is formed into an aspherical wavefront by a computer-generated hologram (CGH) 220, said wavefront corresponding mathematically exactly to the "test object form" (i.e., the form of the relevant mirror 201) at an intended distance. The wavefronts reflected firstly by the reference surface 210 and secondly by the relevant mirror 201 or test object interfere with one another in an interferometer 205. This interferometer 205 is schematically illustrated in FIG. 3 by way of example in terms of its overall design. In particular, a collimator 309, a beam splitter plate 308, a stop 307, an eyepiece 306, a CCD camera 304 and a light source 303 together correspond to the interferometer 205 depicted in in block form in FIG. 2A. Elements 301, 310 and 320 in FIG. 3 correspond respectively to the mirror 201, the reference surface 210 and the CGH 220 in FIG. 2A. An interferogram of the respective mirror is recorded with the CCD camera 304. As indicated in FIG. 2A by the double-headed arrow, the mirror 201 is moved into different positions in a plurality of measurement steps, with only two different positions "A" and "B" being indicated schematically.

Figure 2B:
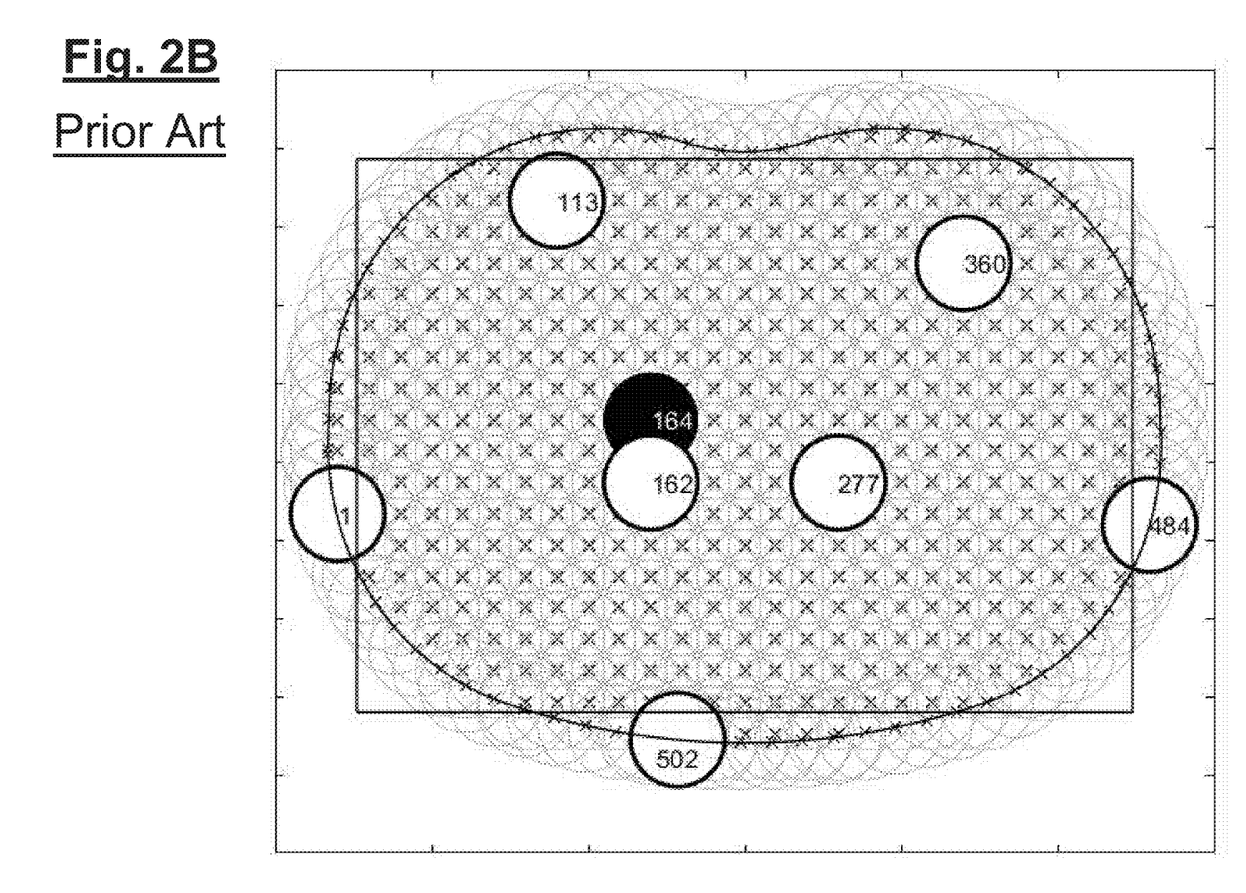
FIG. 2B illustrates a plurality of overlapping individual interferometric measurements "stitched" into a single interferometric measurement.

Carrying out a plurality of measurement steps in different positions of the mirror 201 serves, in particular, to piece together the surface of the mirror 201 (for example, which is not capturable as a whole in a single interferometric measurement) from a plurality of overlapping interferometric individual measurements of so-called "subapertures", none of which separately cover the entire surface. The positions of some of several hundred subapertures of a measurement of a relatively large mirror are shown in FIG. 2B in exemplary fashion and are highlighted, purely by way of example, at positions (1), (113), (162), (164), (277), (360), (484), and (502). Here, the figure of the mirror or test object (i.e., the deviation from a predetermined intended form of the surface), ultimately to be determined, can be reconstructed from the individual subapertures, wherein, in a manner known per se, there firstly is a transformation of the subapertures into a common grid on the test object while taking account of the respective position of the test object and secondly fitting of the subapertures to one another using so-called compensators or sensitivities (in order to obtain the best possible correspondence of the individual transformed subapertures in their overlapping regions). The concept described above is sometimes also referred to as "stitching".

However, a problem arising in practice in this case is that the interferometric measurement setup itself or the optical components located therein in turn has/have deviations from the perfect surface form. However, errors of the reference wave associated therewith are either not taken into account or only insufficiently taken into account in the method described above, which in turn results in an incorrect figure reconstruction and thus, ultimately, in an inaccurate characterization of the optical element or mirror in question.

With regard to the prior art, reference is made purely by way of example to U.S. Pat. No. 6,956,657 B2.

SUMMARY

Against the aforementioned background, it is an object of the present invention to provide a method and an apparatus for characterizing the surface form of an optical element, in particular a mirror or a lens element of a microlithographic projection exposure apparatus, which facilitate a reliable characterization of the surface form while at least partially avoiding the above-described problems.

A method according to the invention for characterizing the surface form of an optical element includes the following steps:

carrying out a plurality of interferometric measurements, in each of which an interferogram is recorded between a test wave emanating from a portion of the optical element in each case and a reference wave, the position of the optical element relative to the test wave being altered between these measurements; and calculating the figure of the optical element on the basis of these measurements;

wherein this calculation is carried out iteratively in such a way that, in a plurality of iteration steps, the figure of the optical element is ascertained in each case by carrying out a forward calculation, each of these iteration steps being based in each case on a reference wave that was adapted on the basis of the preceding iteration step.

In particular, the invention is based on the concept that when the figure of an optical element is calculated on the basis of carrying out a plurality of interferometric measurements, the reference wave is not considered constant as a result for example of neglecting or only carrying out a single, inadequate approximation of the aforementioned errors in the interferometric measurement setup or the optical components located therein. Instead, said reference wave is considered to be a variable parameter, inasmuch as, firstly, the figure of the optical element and, secondly, the reference wave are determined alternately in an iterative method—while taking account of the information obtained in the respective preceding iteration step. Here, the number of iteration steps can be made dependent on reaching a predetermined convergence criterion, for example, or can also be predetermined.

Specifically, according to the invention, there can be a first-time determination of the figure using the "stitching method", as mentioned at the outset and described in more detail below, by initially specifying a specific reference wave, for example, whereupon—using a backward calculation and also using the stitching method—there is a new determination of the reference wave taking into account the ascertained figure. The more precise information about the reference wave obtained in this way can then be used in the next iteration step to improve the determination of the figure, etc.

Alternately carrying out a forward calculation for determining the figure and a backward calculation for determining the reference wave, as described above, results in the reference wave also being determined in pixel-resolved fashion over the course of the iteration, and so a more accurate figure determination can be realized overall.

It should be noted that carrying out the iterative method described above requires a computational "grid transformation" or transformation between, firstly, the coordinate system or pixel grid of the test object and, secondly, the coordinate system or pixel grid of the measurement setup. Such a grid transformation or transformation, already required in the conventional (i.e., non-iterative) stitching method, is required in the method according to the invention not only from the coordinate system of the measurement setup to the coordinate system of the test object, but also in the reverse direction, since the subsequent ascertainment of the reference wave after the figure has been ascertained in one iteration step once again requires the removal of the figure from the respective raw measurement data (i.e., in the coordinate system of the measurement setup) by calculation.

Expressed differently, the figure respectively ascertained in one iteration step is calculated backwards onto the corresponding raw data image and then subtracted or removed by calculation for stitching the reference wave. Moreover, the iterative method according to the invention also facilitates the correct processing or evaluation of interferograms recorded in the plurality of interferometric measurements, in which interferograms only a part of the reference wave contributes to the respective measurement result or is "visible" in the respective interferogram as a consequence of the respective position of the test object. This is achieved by virtue of, in the method according to the invention, the "stitching" described at the outset and explained in even more detail below being used not only when determining the figure of the test object but also when reconstructing the reference wave in the individual iteration steps.

In principle, the start reference wave can be chosen in any suitable manner, since, as a rule, the respective selection only influences the speed of convergence of the iterative method. In exemplary embodiments, the mean value of all measurements with complete filling of the subapertures in each case, a reference wave determined in each case during a previous measurement or evaluation, or else a "zero wave front" can be chosen as the start reference wave.

According to one embodiment, carrying out the interferometric measurements comprises the recording of subapertures, none of which cover the entire surface of the mirror.

According to one embodiment, the respectively adapted reference wave is ascertained by carrying out a backward calculation.

According to one embodiment, carrying out the backward calculation comprises the removal of the figure from the respective measurement data by calculation.

According to one embodiment, carrying out the forward calculation in each case comprises a grid transformation or transformation from a first coordinate system of a measurement setup that is used when carrying out the interferometric measurements to a second coordinate system of the optical element.

According to one embodiment, carrying out the backward calculation in each case comprises a grid transformation or transformation from a second coordinate system of the optical element to a first coordinate system of a measurement setup that is used when carrying out the interferometric measurements.

According to one embodiment, the iterative calculation is carried out until a predetermined convergence criterion is met.

According to one embodiment, the iterative calculation is carried out for a predetermined number of iteration steps.

According to one embodiment, altering the position of the optical element is implemented in such a way that a center of curvature of the optical element remains in place.

In embodiments, the test object can be rotated about an axis on a rotary bearing and measured in a plurality of rotational positions when the plurality of interferometric measurements are carried out, wherein these rotational positions can be arranged with uniform distribution or irregularly.

Exemplary scenarios when carrying out the plurality of interferometric measurements include:

measuring a rotationally symmetrical flat, aspherical or spherical surface on a test station with a rotary bearing, the subaperture extending at least from the edge of the test object to the center of the test object and the rotary bearing axis substantially coinciding with an axis of symmetry of the test object. The position of the test object can be varied by displacing the rotary bearing.

measuring a spherical surface on a test station with a holder that allows the sphere to rotate about more than one axis. In conjunction with iterative stitching, an absolutely calibrating measurement method can be realized in this way.

scanning a surface (which can be a flat surface, a spherical surface, an aspherical surface or a free-form surface) with a multiplicity of subapertures, wherein the grid can be arranged regularly or irregularly. Here, too, the iterative stitching according to the invention can be used to realize an absolutely calibrating method.

According to one embodiment, the optical element is a mirror or a lens element.

According to one embodiment, the optical element is an optical element of a microlithographic projection exposure apparatus.

Further, the invention relates to an apparatus for characterizing the surface form of an optical element, the apparatus being designed to carry out a method with the above-described features. With regard to advantages and preferred configurations of the device, reference is made to the above explanations in association with the method according to the invention.

Further configurations of the invention can be gathered from the description and the dependent claims.

The invention is explained in greater detail below on the basis of exemplary embodiments illustrated in the accompanying figures.

DETAILED DESCRIPTION

Figure 4:
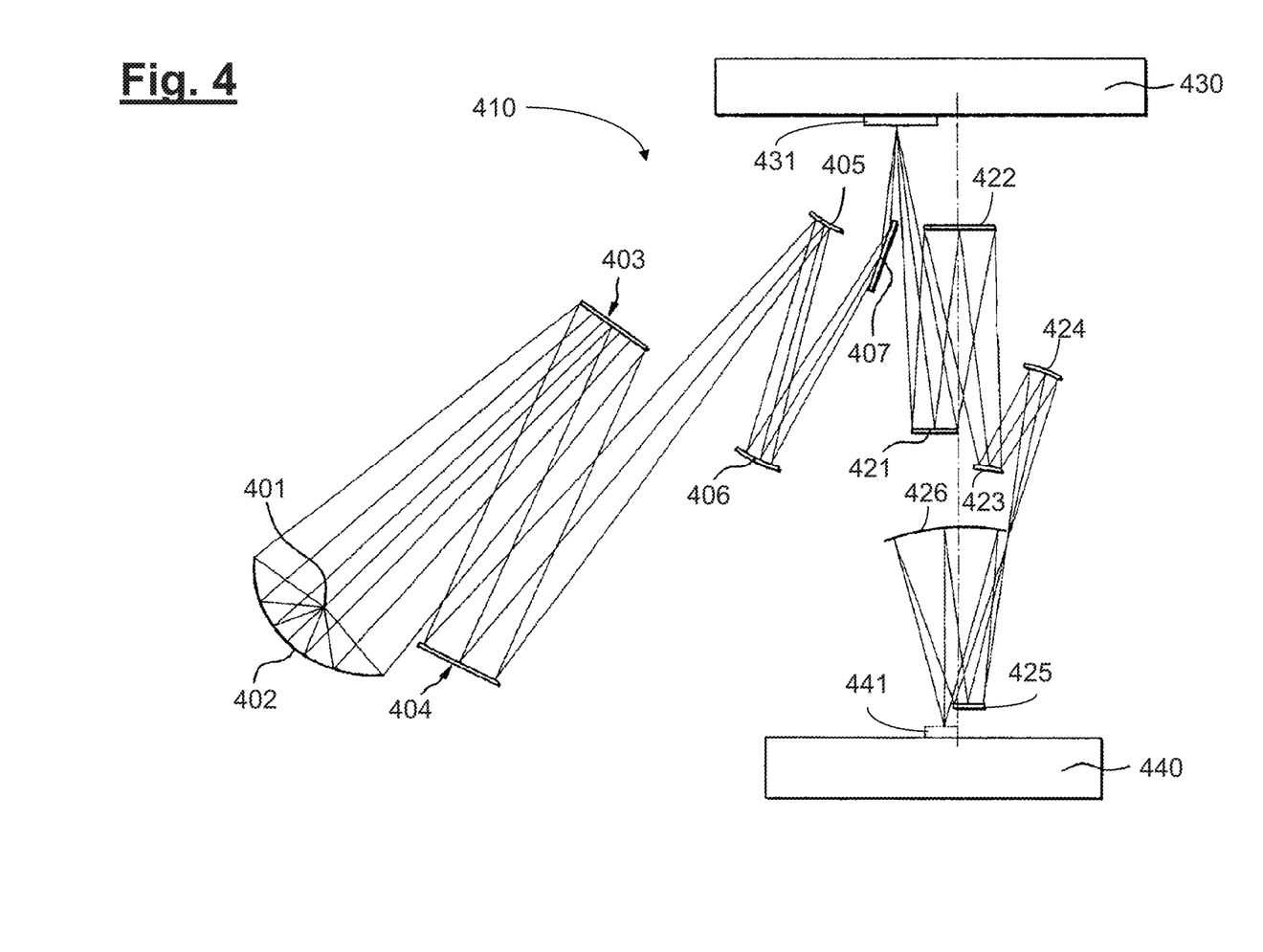
FIG. 4 shows a schematic illustration of a projection exposure apparatus designed for operation in EUV.

FIG. 4 shows a schematic illustration of an exemplary projection exposure apparatus which is designed for operation in the EUV wavelength range and which comprises mirrors which are testable with methods according to the invention.

According to FIG. 4, an illumination device in a projection exposure apparatus 410 designed for EUV comprises a field facet mirror 403 and a pupil facet mirror 404. The light from a light source unit comprising a plasma light source 401 and a collector mirror 402 is directed onto the field facet mirror 403. A first telescope mirror 405 and a second telescope mirror 406 are arranged in the light path downstream of the pupil facet mirror 404. A deflection mirror 407 is arranged downstream in the light path, said deflection mirror directing the radiation that is incident thereon onto an object field in the object plane of a projection lens comprising six mirrors 421-426. At the location of the object field, a reflective structure-bearing mask 431 is arranged on a mask stage 430, said mask being imaged with the aid of the projection lens into an image plane in which a substrate 441 coated with a light-sensitive layer (photoresist) is situated on a wafer stage 440.

The optical element examined with regard to its surface shape or figure within the scope of the invention can be, e.g., any mirror of the projection exposure apparatus 410, for example the (comparatively large) last mirror 426 of the projection lens on the image plane side. In further applications, the optical element can also be a lens element of a projection exposure apparatus designed for operation in the deep ultraviolet (DUV) wavelength range (e.g., at wavelengths shorter than 250 nm, in particular shorter than 200 nm), for example.

The method according to the invention is described below on the basis of an embodiment, with reference being made to the flowchart shown in FIG. 1.

Here, the assumption is made that, for the purposes of characterizing the figure of a mirror, a plurality of (e.g., fifty) subapertures are recorded in individual interferometric measurements with a different positioning of the test object in each case. In particular, the term "subaperture" is intended to express that the interferometric measurements carried out to record the subapertures do not cover the entire surface of the mirror in each case.

Here, a spherical mirror is assumed in the exemplary embodiment, wherein, with reference being made to FIG. 2A again, the variation of the position of the mirror 201 indicated therein is implemented in such a way that the center of curvature remains in place in each case. In further embodiments, the mirror 201 can also be a substantially flat mirror, which is displaced in translational fashion in a direction parallel to the mirror surface between the individual interferometric measurements.

Moreover, a symmetry-breaking arrangement of the individual measurement positions can be chosen in embodiments of the invention. This is advantageous in that measurement results obtained in the individual subaperture measurements can be clearly divided into figure components and reference wave components.

In order now to determine the total or "pieced together" figure of the mirror from said measured subapertures, the invention is based on the "stitching method," known per se, which—as described below with reference to the flowchart in FIG. 1—is modified, however.

Figure 1:
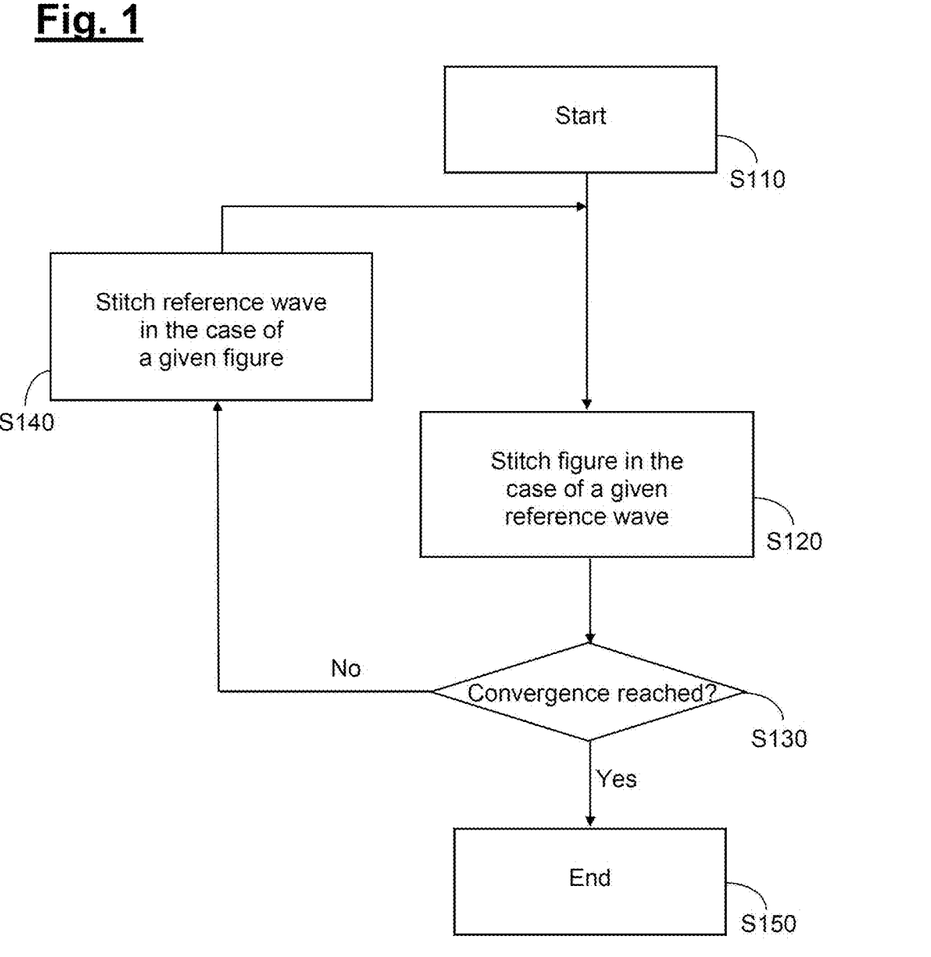
FIG. 1 shows a flowchart for explaining the method steps of a method according to an exemplary embodiment of the invention.

According to FIG. 1, there is initially a first-time calculation of the figure with the specification of a specific reference wave after the start (step S110) of the method. Here, an externally determined start value or a zero function, in particular, can be specified for the reference wave. This first-time calculation of the figure also comprises, in particular, the aforementioned grid transformation or transformation from the coordinate system of the measurement setup to the coordinate system of the test object or mirror 201. The step of "stitching" the figure (at a given reference wave) is labeled "S120" in FIG. 1 and implemented by solving the following minimization problem (which yields a linear system of equations):

$$\min_{f, P_n} = \sum_{i=1}^{m} \int_{x,y} \left[ w_{x,y}^{PRF} \cdot T_{i,x,y}^{CCD \to PRF}(w_i^S) \cdot \right. \\ \left. \left( T_{i,x,y}^{CCD \to PRF}(S_i - I_{n-1}) - \sum_{k} f_{ik} F_{k,x,y} - P_{n,x,y} \right) \right]^2 dxdy \quad (1)$$

Here, and below, the following abbreviations and variables are used:

$P_n$: iteration n of the figure of the optical element or test object $I_n$: iteration n of the reference wave. $I_0$ is either an externally determined start value or a zero function $S_i$: i-th subaperture measurement m: number of subaperture measurements $F_k$: compensators/sensitivities, the amplitudes of which should be varied
$f_{ik}$: Amplitudes of sensitivity k for subaperture i
$w_i^S$: subaperture masks/weight functions for subaperture i.
$w^{PRF}$: figure mask/weight function.
$T_i^{CCD \rightarrow PRF}$: function that transforms a function defined on the measurement grid for the i-th measurement to the test object grid.

In contrast to the conventional (non-iterative) method, the reference wave is now "stitched" according to the invention on the basis of the information received about the figure of the optical element or mirror; this includes a back transformation of the figure into the coordinate system of the measurement setup, in particular. The backward calculation implemented here taking into account the previously ascertained figure leads to more precise or improved information about the reference wave, the corresponding step (i.e., a "stitching" of the reference wave in the case of a given figure) being denoted "S140" in FIG. 1.

The "stitching" of the reference wave $I_n$ in the case of a given figure $P_n$ is implemented by solving the following minimization problem (which also yields a linear system of equations):

$$\min_{f, I_n} = \sum_{i=1}^{m} \int_{x,y} \left[ w_{x,y}^{PRF} \cdot T_{i,x,y}^{CCD \rightarrow PRF}(w_i^S) \cdot \left( T_{i,x,y}^{CCD \rightarrow PRF}(S_i - I_n) - \sum_k f_{ik} F_{k,x,y} - P_{n,x,y} \right) \right]^2 dxdy \quad (2)$$

In embodiments (e.g., to limit the computing time and/or the memory requirement), the "stitching" of the reference wave can also be carried out using only a portion or selection of pixels.

In accordance with FIG. 1, a new forward calculation is implemented in the next iteration step, corresponding to a renewed "stitching" of the figure, etc., on the basis of the improved or more precise information about the reference wave obtained thus.

In embodiments of the invention, the subaperture masks/weight functions or the figure mask/weight functions can be mask functions (function values 0 or 1) which separate valid regions from invalid regions in each measurement. In further embodiments, the subaperture masks/weight functions or the figure mask/weight function can also be "real" weight functions (function value≥0), which are calculated from local measurement errors.

In embodiments of the invention, a relatively smaller weight or even a weight of zero can be used for image regions with a comparatively large measurement error. Moreover, the weights can be refined dynamically over the course of the iterative method.

In principle, the number of measurement positions can be suitably chosen as desired, the number being at least two.

Instead of minimizing the deviation of the model from the real measurements, it is also possible, in analogous fashion, to minimize the difference between two measurements in the overlap region. Such a procedure provides similar solutions and only differs in the choice of weights $w_i^S$.

The grid transformation function T can be selected on the basis of the specific circumstances, in particular with regard to the test object (i.e., adapted to the specific stitching problem). Here, there can be a grid transformation onto a Cartesian grid on the test object, in particular.

The pixel grid spanned on the test object, which is used in "stitching" the figure, can be varied both in respect of the total number of pixels and in respect of the distortion of the grid.

In the exemplary embodiment of FIG. 1, this iterative method ends (in step S150) as soon as a predetermined convergence criterion has been reached in accordance with the query in step S130. In further embodiments, a predetermined number of iteration steps can also be defined in advance; once this number has been reached, the iteration is terminated and the last ascertained figure is output.

Even though the invention has been described on the basis of specific embodiments, numerous variations and alternative embodiments will be apparent to the person skilled in the art, for example through combination and/or exchange of features of individual embodiments. Accordingly, such variations and alternative embodiments are concomitantly encompassed by the present invention, and the scope of the invention is restricted only within the meaning of the appended patent claims and equivalents thereof.

What is claimed is:

1. A method for determining a figure of an optical element, for characterizing a surface form of the optical element, comprising:
    carrying out a plurality of interferometric measurements, in each of which an interferogram is recorded between a test wave emanating from a portion of the surface of the optical element in each case and a reference wave, wherein a position of the surface of the optical element relative to the test wave is altered between each of the measurements; and
    calculating the figure of the optical element based on the plurality of interferometric measurements;
    wherein calculating the figure comprises iterative calculations, in a plurality of iteration steps, for ascertaining the figure of the optical element by carrying out respective forward calculations, each of the iteration steps being based on a respective reference wave that was adapted based on a preceding one of the iteration steps;
    wherein the respectively adapted reference wave is ascertained by carrying out a backward calculation, and wherein carrying out the backward calculation comprises removing the figure from the respective interferometric measurement by calculation.

2. The method as claimed in claim 1, wherein carrying out the interferometric measurements comprises a recording of subapertures, none of which cover an entirety of the surface of the optical element.

3. The method as claimed in claim 1, wherein carrying out the respective forward calculations comprises performing a grid transformation or a transformation from a first coordinate system of a measurement setup that is used when carrying out the interferometric measurements to a second coordinate system of the optical element.

4. The method as claimed in claim 1, wherein carrying out the respective backward calculations comprises performing a grid transformation or a transformation from a second coordinate system of the optical element to a first coordinate system of a measurement setup that is used when carrying out the interferometric measurements.

5. The method as claimed in claim 1, wherein the respective iterative calculations are carried out until a predetermined convergence criterion is met.

6. The method as claimed in claim 1, wherein the respective iterative calculations are carried out for a predetermined number of iteration steps.

7. The method as claimed in claim 1, wherein altering the position of the optical element comprises preserving a position of a center of curvature of the optical element over the plurality of interferometric measurements.

8. The method as claimed in claim 1, wherein the optical element is a mirror or a lens element.

9. The method as claimed in claim 1, wherein the optical element is an optical element of a microlithographic projection exposure apparatus.

\* \* \* \* \*